Patented Nov. 15, 1927.

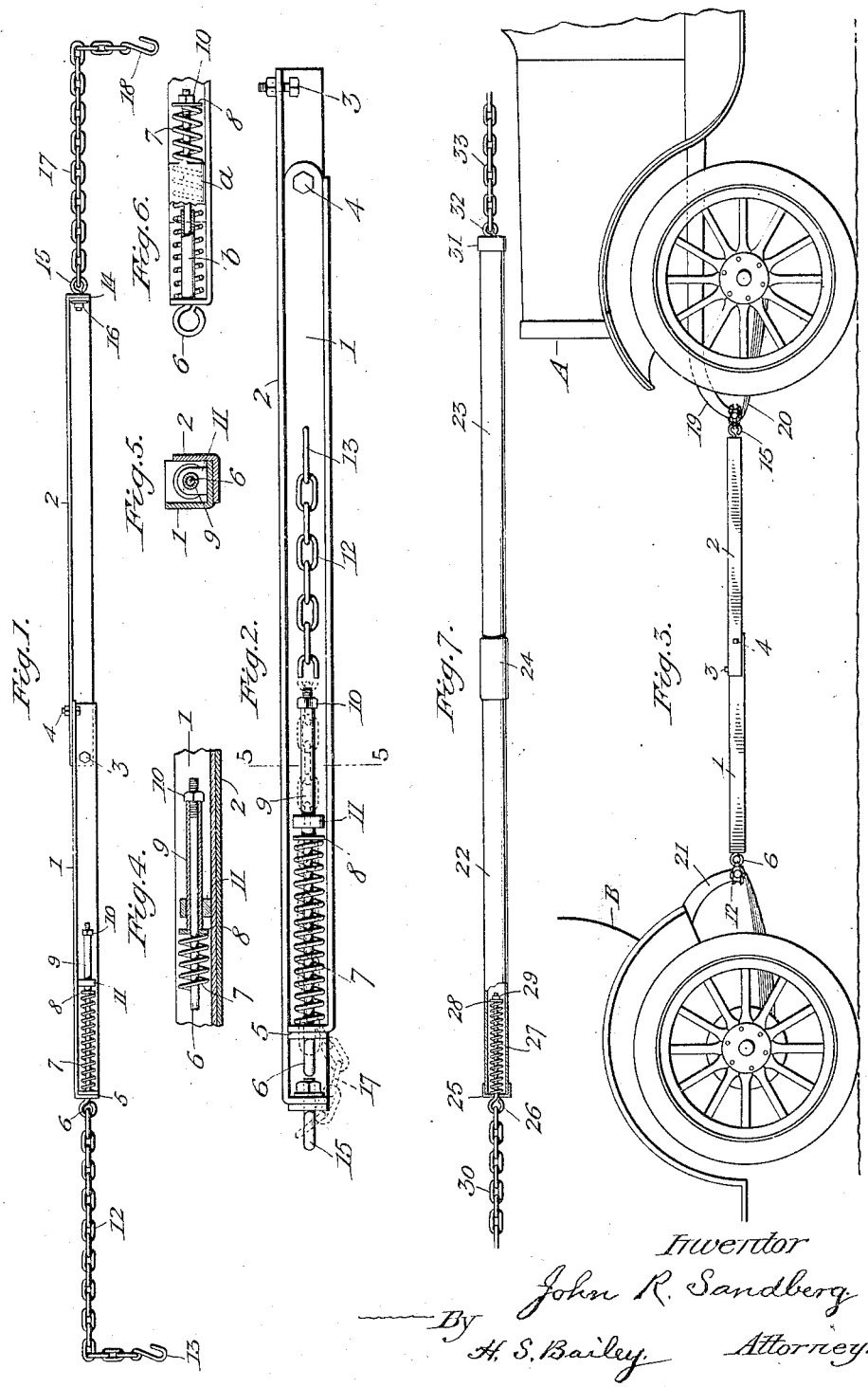

1,649,084

UNITED STATES PATENT OFFICE.

JOHN R. SANDBERG, OF DENVER, COLORADO.

FOLDING TOWING DEVICE FOR AUTOMOBILES.

Application filed February 19, 1927. Serial No. 169,529.

My invention relates to a folding and a rigid automobile connecting and towing device.

And the objects of my invention are:

First, to provide a folding-up metal bar form of an automobile connecting and towing device, by means of which an automobile or truck can be quickly connected to a temporarilly disabled or a broken down or otherwise stalled automobile, and which will provide when straightened out, a stiff non-flexible bar of metal between them.

Second, to provide for motor trucks and automobiles a folding-up tow pulling device, which when unfolded and attached at its opposite ends to tow cars, forms a rigid connection between them that will prevent either from coming in contact with the other during the towing operation.

Third, to provide a folding up and a rigid and also an extensible automobile towing device, that can be made up of solid bars or of tubular members, and that is when it is folded up short enough in length to be carried in an automobile, and that is light enough in weight to be handled and attached to and detached from automobiles by a man or a boy.

Fourth, to provide a very strong, easily and quickly handled and simply constructed automobile towing and pulling device, that can be manufactured and sold for a few dollars, and is a useful device for cross country traveling tourists to have with them.

I attain these objects by the mechanism illustrated in the accompanying drawings, in which:

Figure 1, is a side view of the improved tow bar in unfolded relation as when in use.

Figure 2. is a view on a slightly enlarged scale, showing the sections folded one upon the other, the bar being turned on its longitudinal axes to position the parts at right angles to the positions shown in Fig. 1.

Figure 3, is a side view, showing the application of the improved tow bar.

Figure 4, is a sectional view through one end portion of one of the sections, showing more clearly the guide block for the eyebolt.

Figure 5, is a sectional view in the line 5—5 of Figure 2, the bar being turned on its longitudinal axis, to position the parts at right angles to the positions shown in Fig. 2.

Figure 6, is a sectional view illustrating a modification in connection with the cushioning spring, and Figure 7, is a side view of a modified form of tow bar.

Referring to the drawings, Figures 1, 2 and 3, designate the preferred construction of an automobile towing device embodying my invention, and as illustrated in these figures, it consists of two sections of angle iron preferably one and a quarter inches wide on each side, which is of sufficient strength for towing any passenger automobile, but wider angle iron can be used for very heavy trucks and buses.

The angle iron sections 1 and 2, which constitute the improved tow bar or pole, overlap at their inner ends and are connected by two bolts 3 and 4, the bolt 3 passing through one pair of wings or sides of the angle bars and the bolt 4, which acts as a hinge bolt, passing through the other pair of wings or sides, as shown in Fig. 1. By overlapping the sections a sufficient distance, and connecting them in the manner described, a rigid bar or pole is provided, and when the sections 1 and 2 are folded together, the folded bar is short enough to be conveniently stowed away in the car. The outer ends of the wings of the section 1, are bent at right angles and overlap, as shown at 5, and a hole is formed in these overlapping ends through which a relatively long eyebolt 6 is passed. A coil spring 7, surrounds the eyebolt and bears at one end against the overlapping ends 5, of the section; a washer 8, on the bolt bears against the opposite end of the spring and a sleeve 9, surrounds the bolt, beyond the washer, and is forced against the washer by a nut 10 which is screwed upon the end portion of the bolt, thus holding the spring under tension. A guide block 11 is welded to one wing of the section, through which the sleeve 9 passes, and this guide prevents wabbling of the eyebolt as it moves in or out when in use, as will be understood by reference to Fig. 1. A chain 12, of suitable length is secured at one end to the eye of the bolt 6, and its free end terminates in a hook 13.

The section 2, is slightly longer than the section 1, and the end portions of its wings or sides are bent at right angles and overlap, as shown at 14 and a hole is formed in these overlapping ends. A short eyebolt 15 is passed through this hole, and is secured by a nut 16, which is screwed upon the bolt and against the inner overlapping end member. A chain 17 of suitable length is secured at one end to the eyebolt 15, and the free end of this chain terminates in a hook 18.

When the tow bar is not in use, the section 2 is folded upon the section 1, as shown in Fig. 2, and when thus folded, the two sections form a channel or trough in which the chains 12 and 17 may be disposed. The bar when folded takes up but little room and therefore can be conveniently stowed away in an automobile. In order to fold the bar, the bolt 3 is removed the bolt 4 acting as a hinge bolt, and after the sections are folded, the bolt 3 is inserted in one of the vacant holes, and secured therein by its nut as shown in Fig. 2, so as to prevent its being misplaced.

In practice, when the bar is to be employed in moving a stalled or disabled car or truck, the sections are swung into operative position, as shown in Fig. 1, and secured in this position by the bolt 3. The chain 17 is then secured to the disabled car A, preferably by passing it around the forward end of one of the side bars 19, where it connects with the forward end of the spring 20, and making it fast by connecting the hook 18 to one of the links of the chain. When thus connected, the eyebolt 15 bears against the end of the side bar 19. The chain 12, is then connected in the same manner to the rear end of one of the bars 21 of the towing car B, and so that the eyebolt 6 will bear against the end of the said side bar 21. When connected in this manner, the tow bar maintains a space between the two cars, so that the car A cannot coast against the car B, and the car B, cannot back against the car A. When the towing car moves forward, the pulling strain is received and cushioned by the coil spring 7, thus relieving the strain on the chains and on bolts 3 and 4 connecting the bar sections, and the spring 7 also absorbs the sudden pulling or jerking strains to which the bar is subjected, as the cars proceed, thus eliminating the probability of breakage in either the chains or the bar. The normal tension under which the spring 7 is held, can be increased or diminished, as may be found necessary, by proper adjustment of the nut 10 on the eyebolt 6, and the guide block 11, in which the sleeve 9 is slidably mounted, prevents wabbling of the eyebolt, either when it is drawn out under pulling strain or whether it is in its normal or inactive position.

For light cars, one and one quarter inch angle bars will afford sufficient strength for the purpose intended, but for heavy cars and trucks, angle bars of greater width are necessary. In the case of cars not having side springs and which are therefore not provided with forwardly extending side bars, the chain 17 would have to be secured to the axle of the car, and for such cars, bar sections of greater than ordinary length would be employed, in order to provide sufficient space between the towing car and the car being towed, as will be apparent.

In Fig. 6 is shown a modification in which the guide block 11 is dispensed with, and in its place I employ a metal guide plate $a$, which is welded at its ends to the wings or sides of the angle bar section so as to extend over the spring 7, and prevents wabbling of the spring and of the eyebolt 6, as well, as the eyebolt moves back and forth when in operation.

In this view, the sleeve 9 is dispensed with and the nut 10 bears directly against the washer 8. A sleeve $b$, is placed on the eyebolt, which is about one half the length of the spring and abuts at one end against the folded end of the bar section. When the spring is compressed to about one half of its normal length, the washer 8 on the eyebolt will engage the adjacent end of this sleeve $b$, thus preventing undue compression of the spring and relieving it of the further tension, which would otherwise be the case. The sleeve $b$, may also be used in connection with the construction shown in Fig. 1.

In Fig. 7 is shown a modified form of the tow bar in which tubular sections 22 and 23 take the place of angle iron sections, and these tubular sections are connected by a coupler 24. The outer end of the section 22 is closed by a cap 25 which is screwed thereon, and is provided with a central hole through which passes an eyebolt 26, upon which is mounted a coil spring 27, which abuts at one end against the cap 25, and at its opposite end against a washer 28, which is held against the spring by a nut 29 which is secured upon the end of the eyebolt. A chain 30 is secured at one end to the eyebolt 26, and answers the same purpose as the chain 12 in the other views.

A cap 31 is secured upon the outer end of the section 23, and has secured thereto an eyebolt 32, corresponding to the eyebolt 15 in the other views, and a chain 33 is secured at one end of this eyebolt, which corresponds to the chain 17 in the other views. This bar is operated in the same manner as the one previously described, and when not in use, the sections are disconnected so as to take up the least room when stowed in a car.

Having described my invention, what I claim as new and desire to secure by Letters Patent, is:

1. In a device of the character described, a bar comprising angle iron sections which overlap at their inner ends, a hinge bolt connecting one pair of the overlapping sides of said sections, a bolt connecting the other pair of the overlapping sides and thereby holding said sections in rigid relation, the outer ends of said sections being bent at right angles, eyebolts in said right angled ends, one of which is relatively long and slidably mounted, a washer on said bolt, a nut threaded on said bolt against said washer, a coil spring surrounding said bolt between said washer and the right angled end of the section, chains connected at one end to said eyebolts, their opposite ends terminating in hooks, and means for guiding said eyebolt in its back and forth movement.

2. A bar of the character described; comprising angle iron sections having right angled ends and eye bolts in said ends, one of which is relatively long and slidably mounted, a nut threaded upon the end of said bolt, a sleeve on said bolt abutting at one end against said nut, a washer on said bolt abutting against the other end of the sleeve, a coiled spring surrounding the bolt between the washer and the adjacent right angled end, chains secured at one end to said eyebolts, their free ends terminating in hooks and a rigid guide through which said sleeve passes.

3. In a device of the character described, a bar comprising angle iron sections which overlap bolts extending through said overlapping sections at right angles to each other to hold them in rigid relation, one of said bolts acting as a hinge bolt when the other is removed, thereby enabling the sections to be folded together, eyebolts in the ends of said sections, one of which is relatively long and slidably mounted, a spring for cushioning the pull on said bolt, and chains secured at one end to said eyebolts, which terminate at their free ends in hooks.

In testimony whereof, I affix my signature.

JOHN R. SANDBERG.